(12) United States Patent
Jinkins et al.

(10) Patent No.: US 9,024,805 B1
(45) Date of Patent: May 5, 2015

(54) RADAR ANTENNA ELEVATION ERROR ESTIMATION METHOD AND APPARATUS

(71) Applicants: Richard D. Jinkins, Rewey, WI (US); Daniel L. Woodell, Holts Summit, MO (US); Richard M. Rademaker, Rijswijk ZH (NL)

(72) Inventors: Richard D. Jinkins, Rewey, WI (US); Daniel L. Woodell, Holts Summit, MO (US); Richard M. Rademaker, Rijswijk ZH (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 244 days.

(21) Appl. No.: 13/627,788

(22) Filed: Sep. 26, 2012

(51) Int. Cl.
*G01S 13/08* (2006.01)
*G01C 5/00* (2006.01)
*G01S 7/40* (2006.01)
*G01S 5/02* (2010.01)
*G01S 13/00* (2006.01)
*G01S 7/00* (2006.01)

(52) U.S. Cl.
CPC .................................. *G01S 5/0247* (2013.01)

(58) Field of Classification Search
CPC ........... G01S 7/02; G01S 7/40; G01S 7/4004; G01S 7/4008; G01S 7/4021; G01S 7/4026; G01S 13/02; G01S 13/06; G01S 13/08; G01S 13/88; G01S 13/882; G01S 13/94
USPC .......... 340/945, 947, 951, 963, 970; 701/1, 3, 701/4, 8, 9; 342/29, 33, 73–81, 118, 342/120–123, 165, 173–175, 195
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,334,344 A * | 8/1967 | Colby, Jr. | 342/120 |
| 3,397,397 A | 8/1968 | Barney | |
| 3,680,094 A | 7/1972 | Bayle et al. | |
| 3,716,855 A * | 2/1973 | Asam | 342/33 |
| 3,739,380 A | 6/1973 | Burdic et al. | |
| 3,810,175 A | 5/1974 | Bell | |

(Continued)

OTHER PUBLICATIONS

U.S. Appl. No. 11/851,323, filed Sep. 6, 2007, McCusker.

(Continued)

*Primary Examiner* — Bernarr Gregory
(74) *Attorney, Agent, or Firm* — Angel N. Gerdzhikov; Donna P. Suchy; Daniel M. Barbieri

(57) ABSTRACT

Methods and systems of determining the altitude of an aircraft are provided. The method includes receiving data associated with aircraft position, a position of a first point and a second point on the runway, and an altitude of the first point and the second point, radar returns from the runway. The method includes determining a first range and second range between the aircraft, and the first point and the second point. The method includes determining a first angle and a second angle between the first point and second point, and the aircraft. The method includes determining a corrected angle. The method includes determining the altitude of the aircraft based on the corrected angle, the runway altitude of at least one of the first point and the second point, and at least one of the first range and the second range.

21 Claims, 6 Drawing Sheets

(56) References Cited

U.S. PATENT DOCUMENTS

| | | | |
|---|---|---|---|
| 3,815,132 A | 6/1974 | Case et al. | |
| 4,024,537 A | 5/1977 | Hart | |
| 4,058,710 A | 11/1977 | Altmann | |
| 4,063,218 A * | 12/1977 | Basov et al. | 340/951 |
| 4,594,676 A * | 6/1986 | Breiholz et al. | 342/122 |
| 4,595,925 A * | 6/1986 | Hansen | 342/123 |
| 4,646,244 A | 2/1987 | Bateman et al. | |
| 4,760,396 A | 7/1988 | Barney et al. | |
| 4,828,382 A * | 5/1989 | Vermilion | 342/120 |
| 4,924,401 A | 5/1990 | Bice et al. | |
| 4,939,513 A | 7/1990 | Paterson et al. | |
| 4,987,419 A * | 1/1991 | Salkeld | 342/75 |
| 5,047,781 A | 9/1991 | Bleakney | |
| 5,332,998 A | 7/1994 | Avignon et al. | |
| 5,345,241 A | 9/1994 | Huddle | |
| 5,559,518 A | 9/1996 | DiDomizio | |
| 5,736,957 A * | 4/1998 | Raney | 342/120 |
| 5,820,080 A | 10/1998 | Eschenbach | |
| 5,831,570 A | 11/1998 | Ammar et al. | |
| 5,867,119 A | 2/1999 | Corrubia et al. | |
| 5,923,279 A | 7/1999 | Bamler et al. | |
| 5,945,926 A | 8/1999 | Ammar et al. | |
| 6,023,240 A | 2/2000 | Sutton | |
| 6,061,016 A * | 5/2000 | Lupinski et al. | 342/195 |
| 6,064,942 A | 5/2000 | Johnson et al. | |
| 6,128,553 A | 10/2000 | Gordon et al. | |
| 6,150,901 A | 11/2000 | Auken | |
| 6,154,151 A | 11/2000 | McElreath et al. | |
| 6,157,891 A | 12/2000 | Lin | |
| 6,163,021 A | 12/2000 | Mickelson | |
| 6,166,661 A | 12/2000 | Anderson et al. | |
| 6,169,770 B1 | 1/2001 | Henely | |
| 6,178,391 B1 | 1/2001 | Anderson et al. | |
| 6,194,980 B1 | 2/2001 | Thon | |
| 6,201,494 B1 | 3/2001 | Kronfeld | |
| 6,204,806 B1 | 3/2001 | Hoech | |
| 6,259,400 B1 | 7/2001 | Higgins et al. | |
| 6,266,114 B1 | 7/2001 | Skarohlid | |
| 6,281,832 B1 | 8/2001 | McElreath | |
| 6,285,298 B1 | 9/2001 | Gordon | |
| 6,285,337 B1 | 9/2001 | West et al. | |
| 6,285,926 B1 | 9/2001 | Weiler et al. | |
| 6,317,872 B1 | 11/2001 | Gee et al. | |
| 6,345,127 B1 | 2/2002 | Mitchell | |
| 6,359,585 B1 | 3/2002 | Bechman et al. | |
| 6,373,418 B1 | 4/2002 | Abbey | |
| 6,374,286 B1 | 4/2002 | Gee et al. | |
| 6,377,892 B1 | 4/2002 | Johnson et al. | |
| 6,388,607 B1 | 5/2002 | Woodell | |
| 6,388,608 B1 | 5/2002 | Woodell et al. | |
| 6,421,000 B1 | 7/2002 | McDowell | |
| 6,424,288 B1 | 7/2002 | Woodell | |
| 6,426,717 B1 | 7/2002 | Maloratsky | |
| 6,441,773 B1 | 8/2002 | Kelly et al. | |
| 6,445,310 B1 * | 9/2002 | Bateman et al. | 340/970 |
| 6,448,922 B1 | 9/2002 | Kelly | |
| 6,452,511 B1 | 9/2002 | Kelly et al. | |
| 6,456,236 B1 | 9/2002 | Hauck et al. | |
| 6,462,703 B2 | 10/2002 | Hedrick | |
| 6,473,240 B1 | 10/2002 | Dehmlow | |
| 6,492,934 B1 | 12/2002 | Hwang et al. | |
| 6,512,476 B1 | 1/2003 | Woodell | |
| 6,520,056 B1 | 2/2003 | Nemeth et al. | |
| 6,525,674 B1 | 2/2003 | Kelly et al. | |
| 6,531,669 B1 | 3/2003 | Miller et al. | |
| 6,549,161 B1 | 4/2003 | Woodell | |
| 6,567,728 B1 | 5/2003 | Kelly et al. | |
| 6,574,030 B1 | 6/2003 | Mosier | |
| 6,577,947 B1 | 6/2003 | Kronfeld et al. | |
| 6,590,528 B1 | 7/2003 | DeWulf | |
| 6,603,425 B1 | 8/2003 | Woodell | |
| 6,650,275 B1 | 11/2003 | Kelly et al. | |
| 6,650,291 B1 | 11/2003 | West et al. | |
| 6,690,298 B1 | 2/2004 | Barber et al. | |
| 6,690,299 B1 | 2/2004 | Suiter | |
| 6,697,008 B1 | 2/2004 | Sternowski | |
| 6,697,012 B2 * | 2/2004 | Lodwig et al. | 342/120 |
| 6,710,663 B1 | 3/2004 | Berquist | |
| 6,714,186 B1 | 3/2004 | Mosier et al. | |
| 6,724,344 B1 | 4/2004 | Stockmaster et al. | |
| 6,731,236 B1 * | 5/2004 | Hager et al. | 342/174 |
| 6,738,011 B1 | 5/2004 | Evans | |
| 6,741,203 B1 | 5/2004 | Woodell | |
| 6,741,208 B1 | 5/2004 | West et al. | |
| 6,744,382 B1 | 6/2004 | Lapis et al. | |
| 6,744,408 B1 | 6/2004 | Stockmaster | |
| 6,757,624 B1 | 6/2004 | Hwang et al. | |
| 6,771,626 B1 | 8/2004 | Golubiewski et al. | |
| 6,782,392 B1 | 8/2004 | Weinberger et al. | |
| 6,804,614 B1 | 10/2004 | McGraw et al. | |
| 6,806,846 B1 | 10/2004 | West | |
| 6,807,538 B1 | 10/2004 | Weinberger et al. | |
| 6,813,777 B1 | 11/2004 | Weinberger et al. | |
| 6,819,983 B1 | 11/2004 | McGraw | |
| 6,822,617 B1 | 11/2004 | Mather et al. | |
| 6,825,804 B1 | 11/2004 | Doty | |
| 6,839,017 B1 | 1/2005 | Dillman | |
| 6,850,185 B1 | 2/2005 | Woodell | |
| 6,862,323 B1 | 3/2005 | Loper | |
| 6,879,280 B1 | 4/2005 | Bull et al. | |
| 6,882,302 B1 | 4/2005 | Woodell et al. | |
| 6,918,134 B1 | 7/2005 | Sherlock et al. | |
| 6,933,885 B1 | 8/2005 | Stockmaster et al. | |
| 6,938,258 B1 | 8/2005 | Weinberger et al. | |
| 6,950,062 B1 | 9/2005 | Mather et al. | |
| 6,959,057 B1 | 10/2005 | Tuohino | |
| 6,972,727 B1 | 12/2005 | West et al. | |
| 6,977,608 B1 | 12/2005 | Anderson et al. | |
| 6,995,726 B1 | 2/2006 | West et al. | |
| 6,998,908 B1 | 2/2006 | Sternowski | |
| 6,999,022 B1 | 2/2006 | Vesel et al. | |
| 6,999,027 B1 | 2/2006 | Stockmaster | |
| 7,002,546 B1 | 2/2006 | Stuppi et al. | |
| 7,028,304 B1 | 4/2006 | Weinberger et al. | |
| 7,034,753 B1 | 4/2006 | Elsallal et al. | |
| 7,069,120 B1 | 6/2006 | Koenck et al. | |
| 7,089,092 B1 | 8/2006 | Wood et al. | |
| 7,092,645 B1 | 8/2006 | Sternowski | |
| 7,109,912 B1 | 9/2006 | Paramore et al. | |
| 7,109,913 B1 | 9/2006 | Paramore et al. | |
| 7,129,885 B1 | 10/2006 | Woodell et al. | |
| 7,145,501 B1 | 12/2006 | Manfred et al. | |
| 7,148,816 B1 | 12/2006 | Carrico | |
| 7,151,507 B1 | 12/2006 | Herting | |
| 7,158,072 B1 | 1/2007 | Venkatachalam et al. | |
| 7,161,525 B1 | 1/2007 | Finley et al. | |
| 7,170,446 B1 | 1/2007 | West et al. | |
| 7,170,959 B1 | 1/2007 | Abbey | |
| 7,196,329 B1 | 3/2007 | Wood et al. | |
| 7,205,933 B1 | 4/2007 | Snodgrass | |
| 7,219,011 B1 | 5/2007 | Barber | |
| 7,242,343 B1 | 7/2007 | Woodell | |
| 7,250,903 B1 | 7/2007 | McDowell | |
| 7,265,710 B2 * | 9/2007 | DeAgro | 342/120 |
| 7,269,657 B1 | 9/2007 | Alexander et al. | |
| 7,272,472 B1 | 9/2007 | McElreath | |
| 7,292,178 B1 | 11/2007 | Woodell et al. | |
| 7,307,583 B1 | 12/2007 | Woodell et al. | |
| 7,373,223 B2 | 5/2008 | Murphy | |
| 7,379,796 B2 | 5/2008 | Walsdorf et al. | |
| 7,423,578 B1 | 9/2008 | Tietjen | |
| 7,446,697 B2 * | 11/2008 | Burlet et al. | 342/120 |
| 7,479,920 B2 | 1/2009 | Niv | |
| 7,609,200 B1 | 10/2009 | Woodell et al. | |
| 7,616,150 B1 | 11/2009 | Woodell | |
| 7,633,430 B1 | 12/2009 | Wichgers et al. | |
| 7,639,175 B1 | 12/2009 | Woodell | |
| 7,783,427 B1 | 8/2010 | Woodell et al. | |
| 7,791,529 B2 | 9/2010 | Filias et al. | |
| 7,808,422 B1 | 10/2010 | Woodell et al. | |
| 7,843,380 B1 | 11/2010 | Woodell | |
| 7,859,448 B1 | 12/2010 | Woodell et al. | |
| 7,859,449 B1 | 12/2010 | Woodell et al. | |
| 7,889,117 B1 | 2/2011 | Woodell et al. | |

(56) References Cited

U.S. PATENT DOCUMENTS

| | | | |
|---|---|---|---|
| 7,965,225 B1 | 6/2011 | Dickson et al. | |
| 8,059,025 B2 * | 11/2011 | D'Addio | 342/120 |
| 8,077,078 B1 | 12/2011 | Woodell et al. | |
| 8,410,975 B1 * | 4/2013 | Bell et al. | 342/120 |
| 8,515,600 B1 * | 8/2013 | McCusker | 701/9 |
| 8,576,112 B2 * | 11/2013 | Garrec et al. | 342/29 |
| 8,717,226 B2 * | 5/2014 | Bon et al. | 342/75 |
| 2003/0160718 A1 | 8/2003 | Nagasaku | |
| 2004/0264549 A1 | 12/2004 | Hoole | |
| 2008/0018524 A1 | 1/2008 | Christianson | |
| 2008/0111731 A1 | 5/2008 | Hubbard et al. | |

OTHER PUBLICATIONS

U.S. Appl. No. 12/167,203, filed Jul. 2, 2008, Woodell.
Federal Aviation Administration, Technical Standard Order, TSO-C115b, Airborne Area Navigation Equipment Using Multi-Sensor Inputs, Sep. 30, 1994, 11 pages.
Skolnik, Introduction to Radar Systems, 2001, 3 pages.
Skolnik, Radar Handbook, 1990, 23 pages.

* cited by examiner

RADAR ANTENNA ELEVATION ERROR ESTIMATION METHOD AND APPARATUS

BACKGROUND

The present application relates generally to the field of altitude estimation systems. More specifically, the application relates to method for increased accuracy of altitude estimations.

Altitude estimation systems conventionally provide flight crews with an estimation of an aircraft's current altitude. Altitude estimation systems may be implemented using barometer systems and/or global positioning systems (GPS). Barometer and GPS based systems are subject to inaccuracies, limiting their usefulness during runway approach and landing.

During the final phase of approach and landing, high accuracy altitude information is needed. GPS and barometer based systems may lack the accuracy needed for reliable approach and landing estimations. For example, GPS based systems may only be accurate to within 200 feet without additional equipment.

Furthermore, high accuracy altitude information is required for synthetic vision aided landings. On-board systems may lack the required accuracy for synthetic vision aided landings. To obtain the altitude accuracy needed for synthetic vision aided landings, airports conventionally use additional augmentation systems specific to that airport. As a result, synthetic vision aided landings are only possible at some airports.

Therefore, there is a need for an altitude estimation system and method that may more accurately predict altitude during approach and landing, without the aid of additional equipment. There is also a need for a generic system and method of accurately estimating altitude for use in synthetic vision aided landings, regardless of location.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the present disclosure relates to a method of determining the altitude of an aircraft including radar data taken by an onboard radar system. The method includes receiving first data associated with an aircraft position. The method includes receiving second data associated with a position of a first point and a second point on the runway, and an altitude of the first point and the second point on the runway. The method includes receiving third data associated with radar returns from the runway. The method includes determining a first range between the aircraft and the first point on the runway and a second range between the aircraft and the second point on the runway, using the first and second data. The method includes determining a first angle between the first point on the runway and the aircraft, and a second angle between the second point on the runway and the aircraft, using the third data. The method includes determining a corrected angle relative to at least one of the first point and the second point. The method includes determining the altitude of the aircraft based on the corrected angle, the runway altitude of at least one of the first point and the second point, and at least one of the first range and the second range.

Another embodiment of the present disclosure relates to an aircraft radar system for an aircraft. The aircraft radar system includes an antenna. The aircraft radar system includes processing electronics configured to estimate a first slope of a runway. The processing electronics are also configured to compute a second slope of the runway. The processing electronics are also configured to estimate an error in the pointing angle of the antenna using the first slope and the second slope. The processing electronics are also configured to estimate an aircraft altitude using a range from the aircraft to the runway and a corrected angle between the aircraft and the runway, wherein the error in the pointing angle of the antenna is removed from the corrected angle.

Yet another embodiment of the present disclosure relates to a method of determining the altitude of an aircraft including radar data taken by an onboard radar system. The method includes receiving first data associated with an aircraft position. The method includes receiving second data associated with positions of a plurality of points on the runway, and an altitude of the first point and the second point on the runway. The plurality of points on the runway includes a first point and a second point on the runway. The method includes receiving third data associated with radar returns from the runway. The method includes determining a plurality of ranges between the aircraft and the plurality of points on the runway. The plurality of ranges includes a first range between the aircraft and the first point on the runway and a second range between the aircraft and the second point on the runway, using the first and second data. The method includes determining a plurality of angles between the aircraft and the plurality of points, using the third data. The method includes determining a corrected angle relative to at least one of the plurality of points. The method includes determining an altitude of the aircraft based on the corrected angle, the runway altitude of at least one of the plurality of ranges and at least one of the plurality of ranges.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
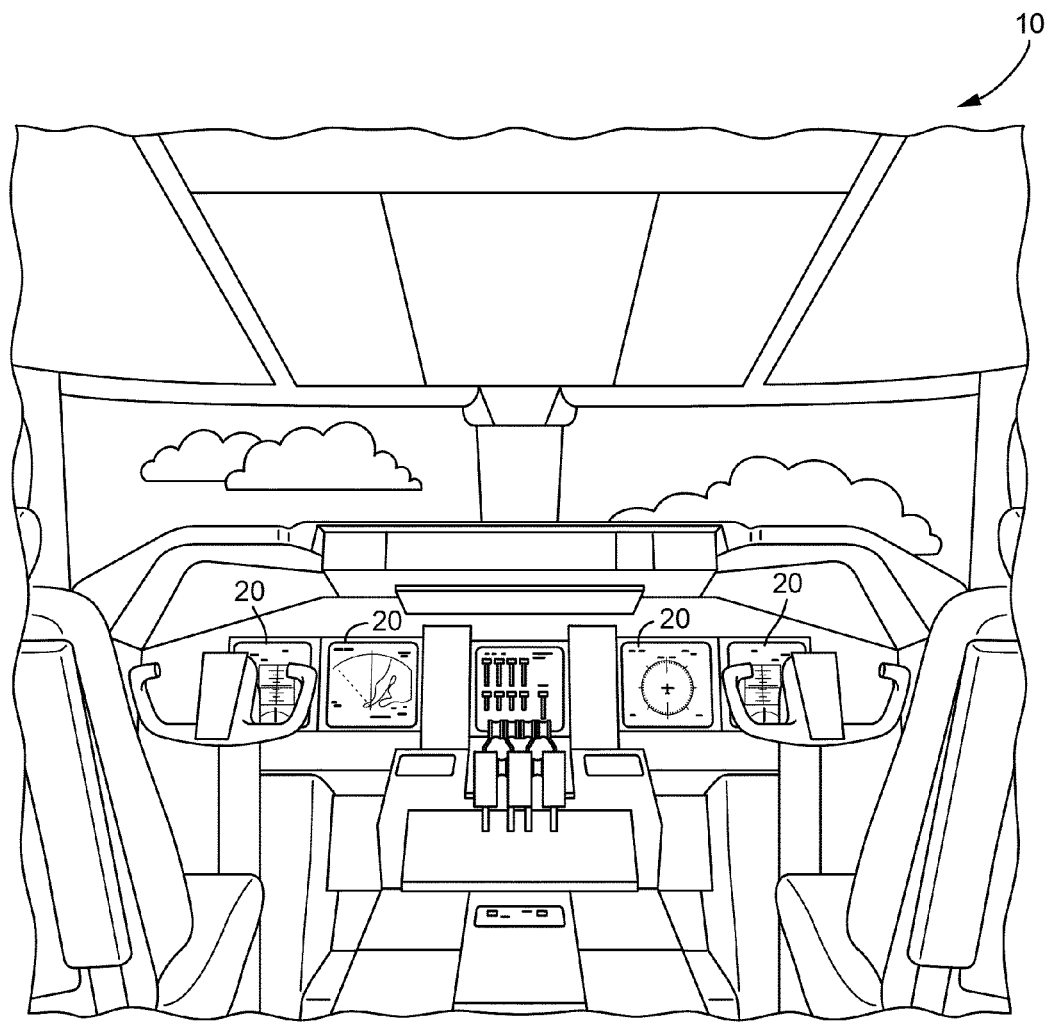
FIG. 1 is an illustration of an aircraft control center, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In one or more embodiments of the present disclosure, an onboard radar measures the elevation angle to the runway landing threshold referenced to local level. With a known range from aircraft to runway end, the local runway height, and the angle between local level and the runway end, aircraft altitude may be computed. The computed altitude may be used either directly or as a calibration offset to local barometric altitude for landing operations.

In one or more embodiments, the generation of a radar based altitude estimate may be corrected for inaccuracy in the estimation of angle(s) to runway for use as a precision source of altitude information. Both mechanical errors and electrical errors may contribute to this problem. These errors may be fixed or time varying. In one or more embodiments, these errors may be estimated in real-time and may be removed to allow the radar angle to runway to be computed with sufficient accuracy to support a synthetic vision system for landing operations. In one or more embodiments, the estimation of radar elevation may be based on the difference between database driven altitude information at either the runway ends or along the entire runway, and similar estimates driven by radar information.

Referring to FIG. 1, an illustration of an aircraft control center or cockpit 10 is shown, according to an exemplary embodiment. Aircraft control center 10 includes flight displays 20 which are used to increase visual range and to enhance decision-making abilities. In an exemplary embodiment, flight displays 20 may provide an output from a radar system of the aircraft. Flight display 20 may provide altitude information and/or synthetic vision information. In a preferred embodiment, display 20 provides altitude information calculated according to the advantageous process described below. The altitude information can be calculated using the altitude of the runway and radar returns during the final phase of flight.

Figure 2A:
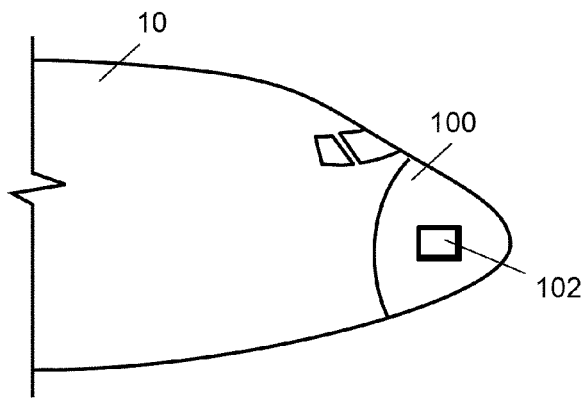
FIG. 2A is an illustration view of the nose of an aircraft including the aircraft control center of FIG. 1, according to an exemplary embodiment.

Referring to FIG. 2A, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 may be located on the top of the aircraft or on the tail of the aircraft. According to an exemplary embodiment, radar system 102 is a weather radar system (such as a Multi-Scan® radar system as manufactured by Rockwell Collins, Inc.). According to another exemplary embodiment, radar system 102 is the radar system described in U.S. Pat. No. 7,889,117 and U.S. Pat. No. 8,077,078, the entireties of which are hereby incorporated by reference. Radar system 102 may include or be coupled to an antenna system.

Figure 2B:
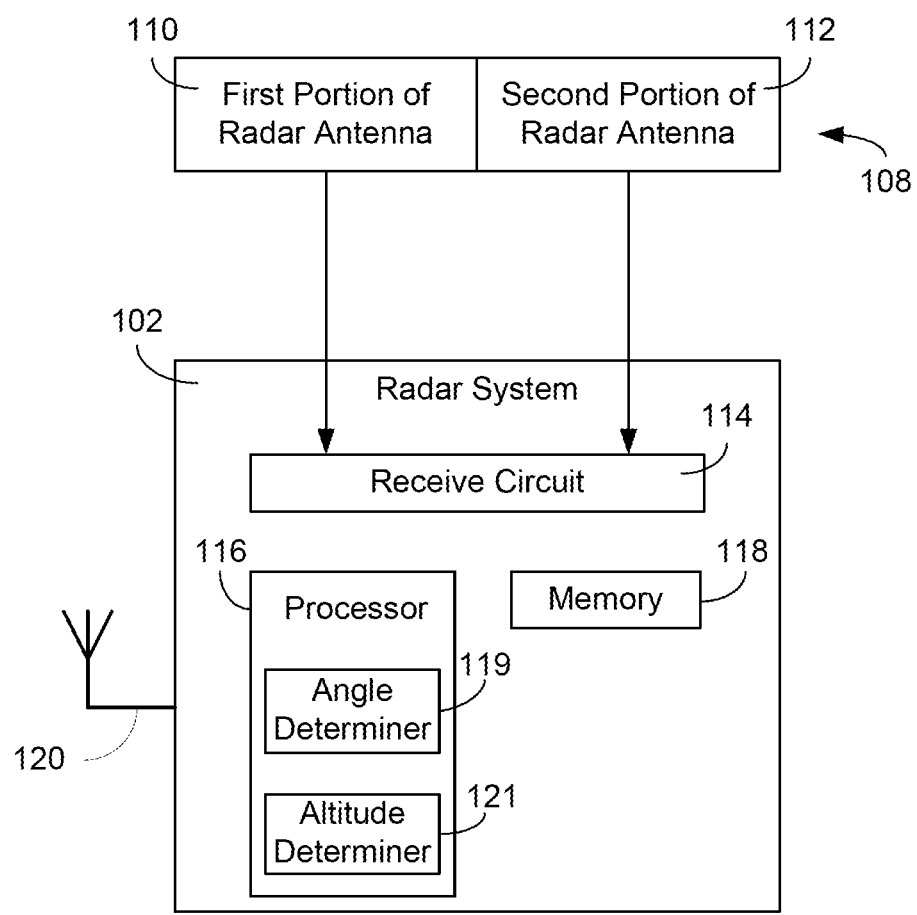
FIG. 2B is a block diagram of a system of receiving and processing radar returns, according to an exemplary embodiment.

In FIG. 2B, radar system 102 is shown in greater detail, according to an exemplary embodiment. Radar system 102 may be coupled to an antenna 108. Antenna 108 may receive radar returns from a target, such as a runway. Furthermore, the radar system 102 may also include a wireless transceiver 120 for wireless communications. The wireless transceiver 120 may use one or more communication protocols, including but not limited to satellite, cellular, FM, AM, Wi-Fi, or other RF communications. The wireless transceiver 120 may wirelessly retrieve data as necessary for use by the aircraft radar system 102.

In one exemplary embodiment, the location of the aircraft and the runway is determined. The locations of the aircraft and runway are used to aim a radar beam at the runway. The location of the aircraft can be determined by various equipment such as the flight management system (FMS), GPS, inertial navigation, etc. Data related to the location of the aircraft may be referred to as first data. The location of the runway can be stored on the aircraft or received as data or audibly via a radio. In a preferred embodiment, the location of one or more points on the runway is used to determine the range to the runway. The runway location can be stored in a database accessible by radar system 102. Alternatively, the range to the runway can be determined using radar or other landing aid equipment. Data related to the location and/or position of points on a runway may be referred to as second data.

In an exemplary embodiment, the radar returns received by radar antenna 108 associated with radar system 102 can be separated into two or more portions 110 and 112, and can be used to determine an angle from system 102 to a target or a vector from system 102 to a target such as a runway. The vector can be represented as an angle (boresite angle) and range to the runway. Various processes can be utilized to calculate the angle or vector to the runway. In one embodiment the angle is expressed as a tilt angle and an azimuth angle. Sub-aperture, sequential lobing, or monopulse techniques can be utilized to determine the tilt angle and azimuth angle. The vector and an altitude of the runway may be used to determine the altitude of the aircraft (preferably, during final phase of flight).

Systems, methods, and apparatuses for using sequential lobing, sub-aperture size antenna, and a variety of pulse patterns are described in U.S. Pat. No. 7,889,117 and U.S. Pat. No. 8,077,078, the entireties of which are hereby incorporated by reference. In some embodiments, the systems, methods, and apparatuses disclosed in U.S. Pat. No. 7,889,117 and U.S. Pat. No. 8,077,078 may be advantageously used in combination with the systems, methods, and apparatuses described herein.

Radar system 102 may include a receive circuit 114 or other circuit configured to receive data (e.g., radar returns) from antenna 108. Data from antenna 108 may be referred to as third data. The third data may be provided to processor 116. According to various exemplary embodiments, processor 116 can be any hardware and/or software processor or processing architecture capable of executing instructions and operating on data related to the radar returns. According to an exemplary embodiment, antenna 108 includes a first portion 110 and second portion 112. In some embodiments, parts of the third data may be associated with the first and second portion because the parts are derived from returns received by the first and second portion, respectively. Alternatively, parts of the third data can be associated with the first and second portion because the parts are derived from returns associated with transmissions from the first and second portions.

The radar system may include a processor 116 or other circuitry to estimate the angle to a target relative to the antenna steering angle (i.e., the angle within the beam to the target), using the returns from the first portion and returns from the second portion. For example, radar system 102 includes an angle determiner 119. Angle determiner 119 may use third data to compute an angle to points on a runway. Radar system 102 also includes altitude determiner 119. Altitude determiner 119 may use angles to the runway, in addition to ranges from the aircraft to points on the runway, to determine the altitude of the aircraft.

Processor 116 and the associated components of radar system 102 may be configured to implement the processes described herein. For example, processor 116 and the associated components of radar system 102 may be configured to estimate a database-derived slope of a runway, compute a radar-derived slope of the runway, estimate an error in the response of the antenna (e.g., mechanical antenna pose and/or electrically-drive errors) using the first slope and the second slope (e.g., subtracting database-derived slope from the radar-derived slope), and estimate an aircraft altitude using a range from the aircraft to the runway and a corrected angle between the aircraft and the runway. The error in the response of the antenna may be removed from the corrected angle.

Figure 3:
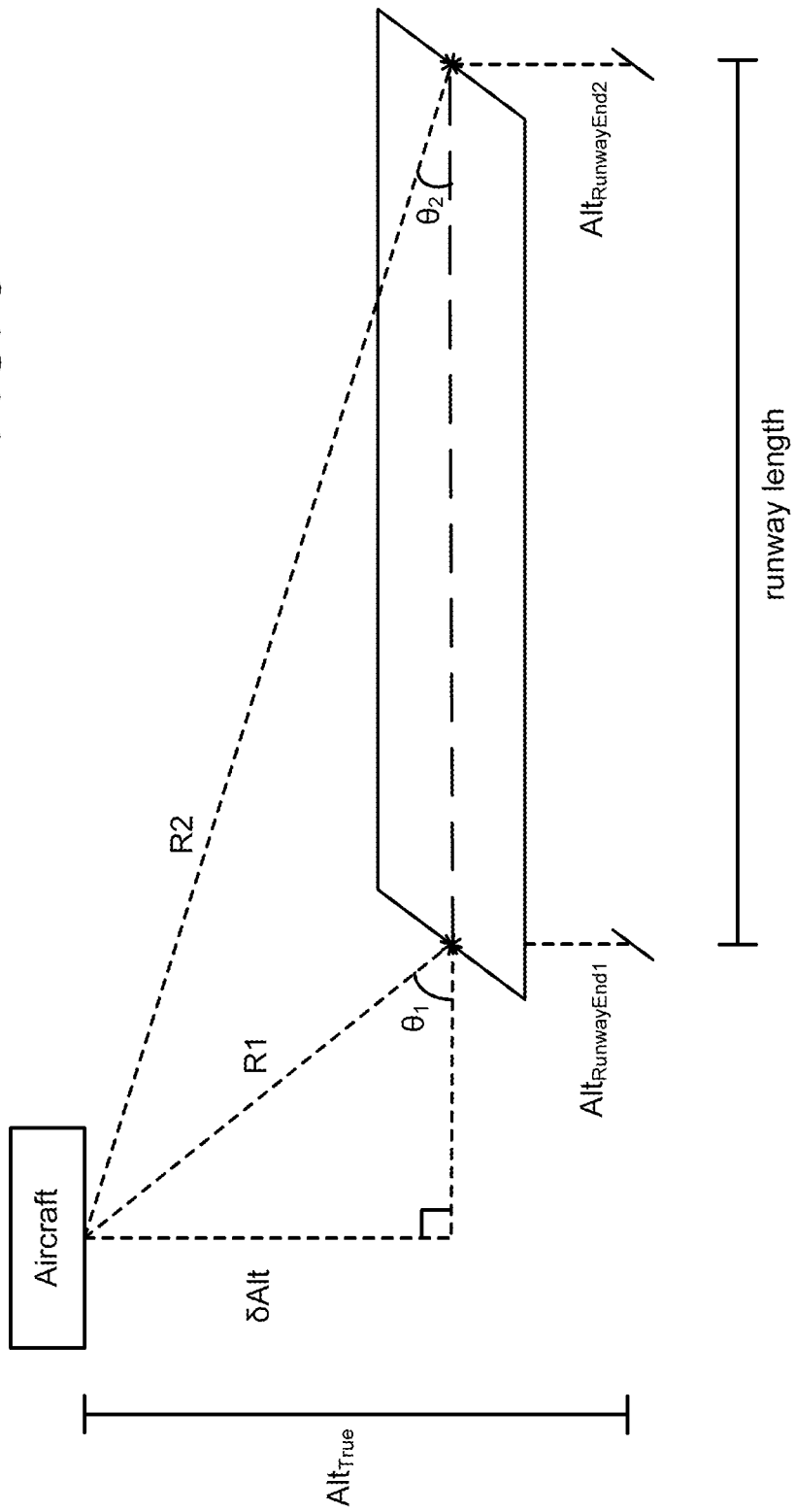
FIG. 3 is an illustration view of an aircraft during a landing approach, according to an exemplary embodiment.

Referring to FIG. 3, an illustration view of an aircraft during a landing approach is shown, according to an exemplary embodiment. FIG. 3 is shown to include an aircraft. The aircraft is at relative or above ground altitude δAlt. FIG. 3 is also shown to include a runway. The runway includes endpoints RunwayEnd1 and RunwayEnd2. The endpoints of a runway may be surveyed locations. Thus, the positions of the runway ends, the distance between the runways ends, the elevation at the runway ends, etc., are known and may be stored in a database. The altitude (above sea level) of the near endpoint of the runway is $Alt_{RunwayEnd1}$, and the altitude of the far endpoint of the runway is $Alt_{RunwayEnd2}$. The true altitude of the aircraft ($Alt_{True}$) (i.e., altitude above mean sea level) is the sum of the relative altitude δAlt and the altitude $Alt_{RunwayEnd}$ of either of the runway endpoints. The endpoint used to calculate the true altitude may be the same endpoint used to calculate the relative altitude. The aircraft is at a range $R_1$ from the near/landing end of a runway. The aircraft is a range $R_2$ from the far end of the runway. In the embodiment of FIG. 3, ranges $R_1$ and $R_2$ are slant ranges. In other embodiments, the range is defined along the ground (with appropriate trigonometric variations—from sine functions to tangent functions—in equations discussed below).

The aircraft may be at an elevation angle $\theta_1$ relative to the near end of the runway and an angle $\theta_2$ to the far end of the runway. In some embodiments, the depression angle or vertical angle may be measured. Angles $\theta_1$ and $\theta_2$ may be angles measured using a radar system of the aircraft. The measured angles may be the sum of both a real angle (φ) and the elevation error (ε) of the system (i.e., θ=φ+ε). Error can arise from static sources (e.g., the radar antenna is not pointing in exactly the intended direction) and from aircraft dynamics (i.e., aircraft movement affects the vertical axis angle of the radar antenna). The error may affect the vertical and/or azimuthal angle of the radar antenna. According to an exemplary embodiment, the pointing error discussed herein one, the other, or both of the mechanical antenna pose and electrically-drive errors of the radar. Elevation errors may be described as an error in the radar response, pointing angle, and/or viewing angle of the radar antenna.

The altitude of the aircraft above ground can be described as a function of both range (R) and angle to a runway end. The actual altitude of the aircraft can be calculated using the real angle φ. The estimated altitude of the aircraft can be calculated using the measured angle θ. Throughout the discussion herein, "actual" is used to indicate the true state of aircraft. "Estimated" is used to indicate the measured state of the aircraft. Thus, estimated quantities may be associated with angle and/or elevation errors whereas actual quantities are not.

From trigonometric principles, the above ground altitude of the aircraft is $$\delta Alt = R_1 \cdot \sin(\phi_1) = R_2 \cdot \sin(\phi_2) \quad \text{(Eq. 1)}$$

Without elevation errors, the true aircraft altitude ($Alt_{True}$) is the sum of the above ground altitude (δAlt) and the altitude of the runway endpoint ($Alt_{RunwayEnd}$):

$$Alt_{True} = \delta Alt + Alt_{RunwayEnd} \quad \text{(Eq. 2)}$$

The true aircraft altitude is the same whether referenced to one end of the runway or the other. Thus, $$Alt_{TrueRunwayEnd1} = Alt_{TrueRunwayEnd2} \quad \text{(Eq. 3)}$$

Substituting equation 2 into equation 3, $$\delta Alt_{RunwayEnd1} + Alt_{RunwayEnd1} = \delta Alt_{RunwayEnd2} + Alt_{RunwayEnd2} \quad \text{(Eq. 4)}$$

From equation 1, $$R_1 \cdot \sin(\phi_1) + Alt_{RunwayEnd1} = R_2 \cdot \sin(\phi_2) + Alt_{RunwayEnd2} \quad \text{(Eq. 5)}$$

For example, an aircraft 1.5 nautical miles from the runway may have a 3° glide slope on approach. The 3° glide scope angle is equal to the real angle $\phi_1$ relative to near end of the runway. The near runway end ("RunwayEnd1") may have a barometric altitude ($Alt_{RunwayEnd1}$) of 600 feet, and the far end of the runway ("RunwayEnd2") may have a barometric altitude ($Alt_{RunwayEnd2}$) of 620 feet. The runway may have a length of 1 nautical mile. The range $R_1$ to the near end of the runway is 1.5 nautical miles or 9,114 feet. The range $R_2$ to the far end of the runway is the sum of the distance to the near end and the length of the runway: 2.5 nautical miles or 15,190 feet. The altitude of the aircraft may be calculated. From equation 4, the actual aircraft altitude above ground is $$\delta Alt_{RunwayEnd1} := R_1 \sin(\phi_1) = 9{,}114 \text{ ft} \cdot \sin\left(\frac{3°}{57.3°/\text{rad}}\right) = 476.955 \text{ ft}$$

Note that range $R_1$ and the real angle $\phi_1$ correspond to the near end of the runway (RunwayEnd1). From equation 5, the actual true aircraft altitude is $$Alt_{TrueActual} = \delta Alt_{RunwayEnd1} + Alt_{RunwayEnd1} = 476.955 \text{ ft} + 600 \text{ ft} = 1{,}076.955 \text{ ft}$$

As above, the runway altitude used is the runway altitude of the near end of the runway (RunwayEnd1). According to an exemplary embodiment, the range, angle (measured and/or actual), and the runway altitude are all relative to the same point on the runway. The actual elevation angle $\phi_2$ relative to the far end of the runway can also be calculated. Rearranging equation 1 and using the calculated true aircraft altitude, $$\phi_2 := \arcsin\left(\frac{Alt_{TrueActual} - Alt_{RunwayEnd2}}{R_2}\right) \quad \text{(Eq. 6)}$$

$$= \arcsin\left(\frac{1{,}076.955 \text{ ft} - 620 \text{ ft}}{15{,}190 \text{ ft}}\right) = 1.724°$$

In this example, the angle difference between runway ends that are 1 nautical mile apart is approximately 1.3°. According to an exemplary embodiment, a radar antenna may have a beamwidth of approximately 8°. With such a radar, a single fixed antenna pointing interval can be used advantageously to illuminate both runway ends (as described in the discussion of FIG. 4B).

As indicated above, the angle measurements may have a real component and an error component (i.e., $\theta = \phi + \epsilon$). A relatively small antenna pointing error may cause a substantial elevation error. Continuing the example above, the elevation error can be calculated. With an antenna pointing error ($\epsilon$) of 0.5° and an altitude above ground ($\delta Alt_{RunwayEnd1}$) equal to 476.955 ft (calculated above), the elevation error is $$\delta Alt_{Error} := \delta Alt_{Estimated} - \delta Alt_{RunwayEnd1}$$
$$= R_1 \cdot \sin(\theta_1) - \delta Alt_{runwayEnd1}$$
$$= R_1 \cdot \sin(\phi_1 + \varepsilon) - \delta Alt_{RunwayEnd1}$$
$$= 9{,}114 \text{ ft} \cdot \sin\left(\frac{3° + 0.5°}{57.3°/\text{rad}}\right) - 476.955 \text{ ft} = 79.401 \text{ ft}$$

A method may be provided so that antenna pointing errors are identified and substantially removed from an angle measurement. The corrected angle measurement may then be used to calculate the aircraft altitude. Using the corrected angle measurement may reduce the elevation error in the estimated aircraft altitude.

Figure 4A:
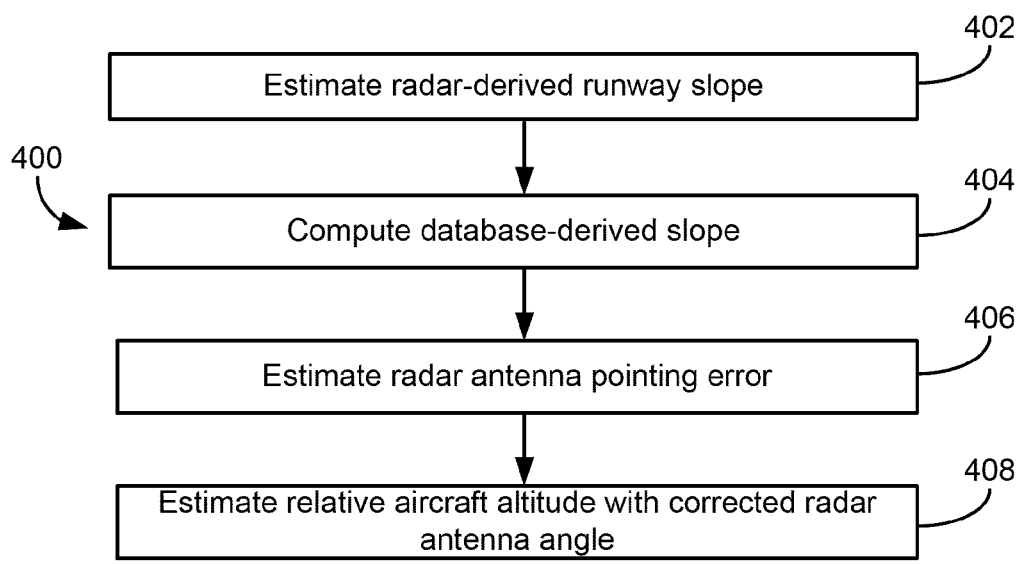
FIG. 4A is a flow diagram of a process for estimating aircraft altitude, according to an exemplary embodiment.

Referring to FIG. 4A, a flow diagram of a process 400 for estimating aircraft altitude is shown, according to an exemplary embodiment. Process 400 may be carried out by the apparatus (e.g., radar antenna and processing circuit) of FIG. 2B. Process 400 may be a high level description of processes described in more detail in the discussions of FIGS. 4B-4C.

Process 400 includes estimating a radar-derived runway slope (402). The radar-derived slope may be described as a second slope. The radar-derived runway slope may be calculated from radar returns received at a radar antenna. According to an exemplary embodiment, angles to two points (e.g., runway ends) along the runway are measured. The angles to the two points on the runway may be used with the range to the two points to calculate a radar-derived runway slope. This is described in greater detail in the discussion of FIG. 4B. According to another exemplary embodiment, the slope of the sensed runway surface is estimated. The angles and distances to a plurality of points may be used to calculate a plurality of elevations. Data points representing the distances and the corresponding elevations may be fitted using robust line fit methods. The slope of the fitted line may determine the overall radar-derived runway slope. This is described in greater detail in the discussion of FIG. 4C. The term "radar-derived" is used to describe a slope of the runway that is determined at least partly from quantities measured using a radar. For example, the angles to the points along the runway are calculated from radar returns received at a radar antenna. In some embodiments, quantities other than those measured using radar may be used to compute a radar-derived slope.

Process 400 includes computing a database-derived runway slope (404). The database-derived slope may be described as a first slope. According to an exemplary embodiment, the slope of a runway may be determined using surveyed runway end points or other points on the runway. The position of the runway end points, and the length of the runway, may be known. Similarly, the altitude of the runway endpoints, and the difference between them, may also be known. A database-derived runway slope may be calculated using differences in altitude and position of the runway end points. The term "database-derived" is used to describe a slope of the runway that is determined at least party from previously-measured quantities (and not quantities measured using radar when an aircraft altitude is being determined). For example, the altitude of the runway ends may be previously-determined and stored in a database accessible by radar system 102 (FIG. 2B). In some embodiments, quantities other than those previously-measured, such as quantities measured using radar when an aircraft altitude is being determined, are used to compute a database-derived slope.

Process 400 includes estimating the radar antenna pointing error (406). According to an exemplary embodiment, the radar pointing error is described in terms of the radar-derived runway slope and the database-derived runway slope. In one embodiment, the error is the difference of the radar-derived runway slope and the database-derived runway slope. According to an exemplary embodiment, the pointing error is error in at least one of the mechanical antenna pose and the electronics for receiving radar returns, computing quantities based on the radar returns, etc.

Process 400 includes estimating the relative (above ground) aircraft altitude with a corrected radar pointing angle. According to an exemplary embodiment, the error estimated in step 406 is used to calculate a corrected radar antenna angle. Thus, the angles measured at one or more points on a runway are corrected to account for the identified pointing error. The corrected angles, the distance to the one or more points on the runway, and trigonometric principles illustrated in FIG. 3 may be used to calculate the relative aircraft altitude. In various embodiments, the true aircraft altitude may also be calculated.

Figure 4B:
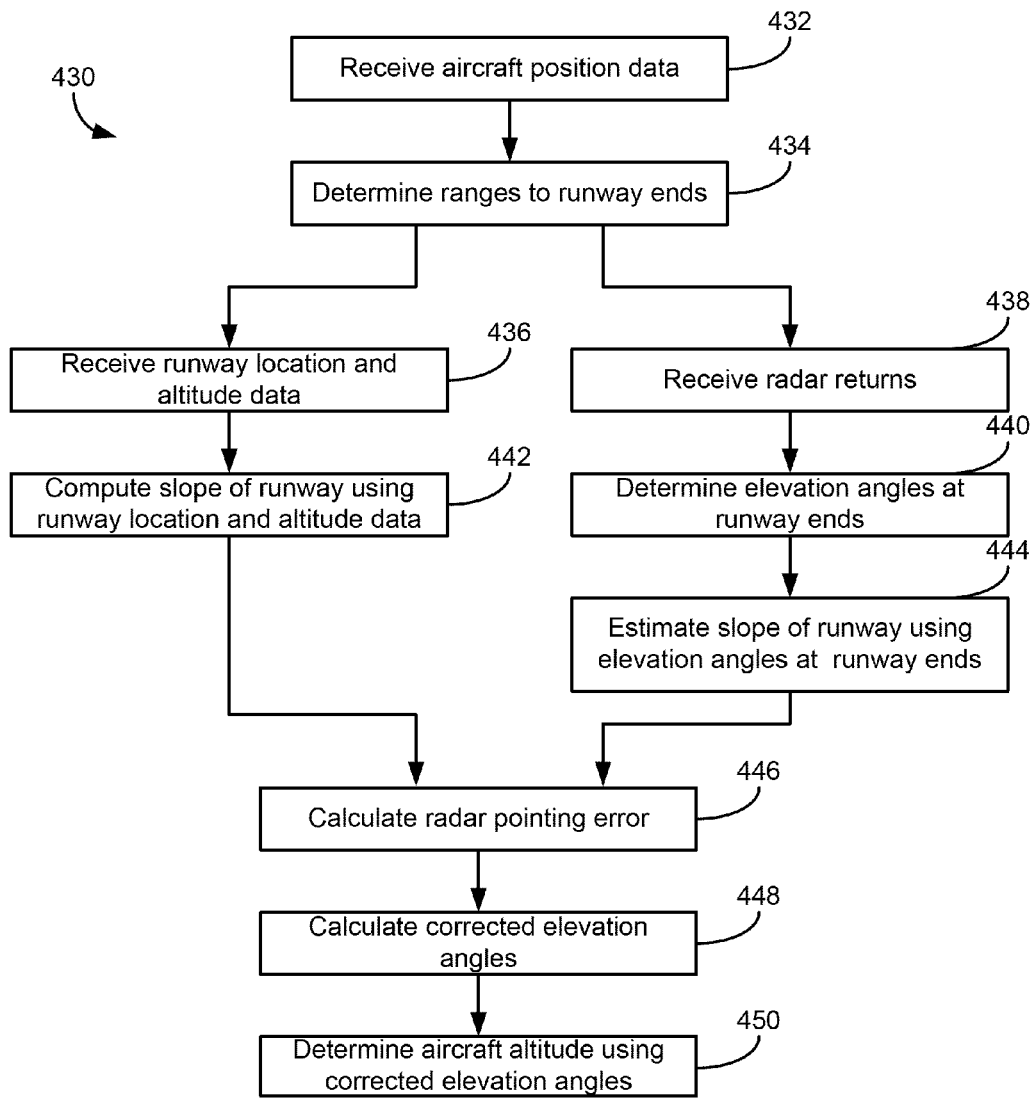
FIG. 4B is a flow diagram of a process for estimating aircraft altitude using angle measurements at two points along a runway, according to an exemplary embodiment.

Referring to FIG. 4B, a flow diagram of a process 430 for estimating aircraft altitude using angle measurements at two points along the runway is shown, according to an exemplary embodiment. Process 430 may be carried out by the apparatus (e.g., radar antenna and processing circuit) of FIG. 2B. Process 430 may be one embodiment of a more-detailed implementation of process 400 (FIG. 4B). Process 430 may include comparing a database-derived slope and a radar-derived slope to identify a radar antenna pointing error. The radar-derived slope may be determined from angles at the runway ends. The aircraft's relative (above ground) and/or true (height above sea level) altitude may be calculated using the corrected angles. Therefore, the aircraft's altitude may be more accurately estimated using conventional aircraft systems adapted to perform the advantageous process described herein.

Process 430 includes receiving aircraft position data (432). Aircraft position and/or location data may be referred to as first data. Aircraft location may be determined by various equipment such as the flight management system (FMS), GPS, inertial navigation, etc., or received as data or audibly via a radio. The aircraft location may be used in conjunction with the runway location (step 436) to determine the ranges to the runway ends (step 434).

Process 430 includes determine the ranges to the runway ends (434). The range to the runway can be determined according to any radar return process for determining range or from other aircraft equipment capable of providing range to a runway or relative position between the aircraft and the runway. In one embodiment, the time between transmission and reception of a radar beam is used to determine range. According to an exemplary embodiment, the range is determined from non-weather radar sources. The range may be determined from aircraft location and runway location. In the embodiment of FIG. 3, the range to the landing end of the runway ("RunwayEnd1") is labeled "R1" and the range to the far end of the runway ("RunwayEnd2") is labeled "R2." R1 and R2 may be slant ranges. In some embodiments, range along the ground may be used (with appropriate trigonometric variations in the equations discussed herein). In other embodiments, more than two points along the runway and/or points other than the endpoints may be chosen.

Process 430 includes receiving runway location and altitude data (436). Runway location and altitude data may be described as second data. The runway data may be retrieved from memory 118 and/or from a wireless transceiver 120 (FIG. 2B). The altitude and position runway may be known and stored in a database (in, e.g., memory 118). This may be true when the runway ends are surveyed locations. Furthermore, runway data can be obtained via an instrument landing system (ILS) or microwave landing system (MLS). The location of the aircraft may be used to identify the runway entry. Runway location data and aircraft location data (step 432) may be used to determine ranges to one or more points on the runway.

Process 430 includes receiving radar returns (438). Data associated with the radar returns may be referred to as third data. The radar returns may be used to determine elevations angles at the runway ends (step 440). According to an exemplary embodiment, the radar returns are received with the radar in a stationary viewpoint. Thus, step 438 may additionally include slewing or pointing the antenna to point at both runway ends. An aircraft may do so, for example, during an ILS approach with a 3° glide slope. Positioning the antenna to see both ends of the runway may advantageously account for multiple sources of error in altitude estimation. As indicated above, the measurement from a radar antenna may be associated with static errors and errors due to the dynamics of the aircraft. Both types of error affect the angle measurement to points along a runway. According to an exemplary embodiment, two points along the runway (e.g., near/landing endpoint and far endpoint) are chosen. In other embodiments, more than two points and/or points other than the runway endpoints are chosen.

Process 430 includes determining the elevation angles at the runway ends (440). In some embodiments, the vertical angles or depression angles are measured. According to an exemplary embodiment, the elevation angles are estimated from radar returns received at the radar antenna. For example, the angle to a point on the runway is estimated according to the processes discussed in U.S. Pat. No. 7,889,117 and U.S. Pat. No. 8,077,078. However, other angle estimation techniques can be utilized. The angles at the runway ends are depicted in FIG. 3. The measurements may include angle $\theta_1$ between the aircraft and the landing end of the runway (labeled "RunwayEnd1" in FIG. 3) and angle $\theta_2$ between the aircraft and the far end of the runway (labeled "RunwayEnd2" in FIG. 3). In other embodiments, more than two points along the runway and/or points other than the endpoints may be chosen. In still other embodiments, as described in discussion of FIG. 4C, a plurality of points along the runway may be used.

According to an exemplary embodiment, the elevation angles are measured from a common view point (i.e., same antenna pose). Using a common antenna elevation viewing point allows the common error assumption to be invoked: any antenna elevation movement or error will affect both runway end estimates equally, in angle space. As described below, these errors can then be estimated and removed. In other embodiments, the elevation angles are determined from radar returns received with different antenna poses. The radar antenna may be pointed towards one end of the runway, and the angle may be measured. At a later time, the antenna may be swept or moved to point to the other end of the runway, and the angle is measured. To account for aircraft dynamics that occur between the two measurements (giving rise to different errors for each angle estimation), rate gyros may be used to measure changes in yaw and elevation. The common error (i.e., error after changes due to aircraft dynamics have been removed) may then be identified and removed.

According to an exemplary embodiment, the system described herein may account for errors in the radar samples taken with the same beam position or positions. The same antenna pose or a common antenna movement interval may be used. Any uncompensated angle error will be seen in all the radar samples. This allows "common mode" errors to be removed. Common mode errors may be removed when the angular error estimated from radar samples taken with the same beam position(s). Data taken with the same beam positions will have similar uncompensated angular errors that are identified and removed in the estimation process.

Process 430 includes estimating the slope of the runway using elevation angles and ranges to runway ends (442) and computing the slope of the runway using runway location and altitude data (444). Step 442 may be described as computing a database-derived slope, and step 444 may be described as estimating a radar-derived slope. According to an exemplary embodiment, the database-derived slope and the radar-derived slope are used to calculate the radar pointing error (446). Process 400 may advantageously identify and substantially remove errors associated with angle measurements used to calculate aircraft altitude. The database-derived slope and the radar-derived slope are compared to identify the radar antenna pointing error. Because the angle difference is the result of multiple sources of error, correcting for the angle difference may advantageously account for multiple sources of error.

According to an exemplary embodiment, the angle error may be calculated using the database-derived slope and the radar-derived slope. The radar-derived slope may be estimated using the determined angles at the runway ends (step 440) and the range to the runway ends (step 434). The database-derived slope may be computed using the runway location and altitude data (step 436) and the range to the runway ends (step 434). In other embodiments, more than two points on the runway and/or points other than the endpoints may be used. FIG. 3 is labeled with many of the quantities described below.

The real elevation angle ($\phi$) at the runway ends may be expressed in terms of the measured angle ($\theta$) and the elevation error elevation error ($\epsilon$): $\phi = \theta - \epsilon$. If the two endpoints of the runway are viewed from the same antenna pose, the error angle is the same for both runway ends. Thus, equation 5 may be rewritten as $$R_1 \cdot \sin(\theta_1 - \epsilon) + Alt_{RunwayEnd1} = R_2 \cdot \sin(\theta_2 - \epsilon) + Alt_{RunwayEnd2} \quad \text{(Eq. 7)}$$

The small angle approximation can be used to remove the sine functions in equation 7. The small angle approximation may be used because the overall task is altitude estimation during a 3° classic approach. Thus, $$R_1 \cdot (\phi_1 - \epsilon) + Alt_{RunwayEnd1} = R_2 \cdot (\theta_2 - \epsilon) + Alt_{RunwayEnd2} \quad \text{(Eq. 8)}$$

Equation 8 can be solved to generate an error correction term:

$$\varepsilon_{CorrectionEstimate} = \frac{(-R_1 \cdot \theta_1 + Alt_{RunawayEnd2} - Alt_{RunwayEnd1} + R_2 \cdot \theta_2)}{R_2 - R_1} \quad \text{(Eq. 9)}$$

The error correction term of equation 9 can be organized such that one portion of the equation represents the measured runway slope and another portion represents the database runway slope. The numerator of equation 9 can be rearranged:

$$\varepsilon_{CorrectionEstimate} = \quad \text{(Eq. 10)}$$
$$\frac{(R_2 \cdot \theta_2) - (R_1 \cdot \theta_1) - (Alt_{RunwayEnd2} - Alt_{RunwayEnd1})}{R_2 - R_1}$$

Factoring equation 10 into two sections, $$\varepsilon_{CorrectionEstimate} = \quad \text{(Eq. 11)}$$
$$\frac{(R_2 \cdot \theta_2) - (R_1 \cdot \theta_1)}{R_2 - R_1} - \frac{(Alt_{RunwayEnd2} - Alt_{RunwayEnd1})}{R_2 - R_1}$$

The first portion of equation 14 represents the measured or radar-derived runway slope in that it contains measured quantities. The second portion of equation 14 represents the database runway slope in that it contains quantities that may be stored and accessible in a database. For example, the runway ends may be surveyed locations, so the altitude above sea level at each end is known and stored in, e.g., memory 118 (FIG. 2B).

Continuing the example from the discussion of FIG. 3, the angle measurements may be $\theta_1 = 3.5°$ and $\theta_2 = 2.224°$. The angle measurements include an error of 0.5°. If the error correction term of equation 9 is valid, then computing the error correction term should identify the angle error. The error correction term (using equation 10), with $R_1 = 9,114$ ft, $R_2 = 15,190$ ft, $Alt_{RunwayEnd1} = 600$ ft, and $Alt_{RunawayEnd2} = 620$ ft is $$\varepsilon_{CorrectionEstimate} =$$
$$\frac{(-R_1 \cdot \theta_1 + Alt_{RunwayEnd2} - Alt_{RunwayEnd1} + R_2 \cdot \theta_2)}{R_2 - R_1} = 0.499°$$

Equation 9 may be considered a valid description of the error because the estimated error correction (0.499°) substantially cancels the error in the angle measurements (0.5°).

Process 430 includes calculating corrected elevation angles (448). The corrected angles may be calculated using the angles determined in step 440 and the error correction term calculated in step 446. The difference of the measured angle and the error correction term is the corrected angle (i.e., the estimated real angle $\phi_{Est}$):

$$\phi_{Est} = \theta_{Measured} - \varepsilon_{CorrectionEstimate} \quad \text{(Eq. 12)}$$

Continuing the example above, the corrected angle is $$\phi_{Est} = \theta_{Measured} - \varepsilon_{CorrectionEstimate} = 3.5° - 0.499° = 3.001°$$

Note that the corrected angle is substantially identical to the actual elevation angle relative to the near end of the runway (3°, from the standard ILS approach).

Process 430 includes calculating relative (above ground) aircraft altitude using the corrected angles (450). According to an exemplary embodiment, one of the measured elevation angles is corrected to calculate an above ground altitude. The range to the point relative to which the elevation angle is measured is used in the calculation. In some embodiments, when multiple measured elevation angles are corrected, the respective ranges are used in the calculation of relative altitude. The estimated above ground altitude can be calculated with the corrected angle and the equation for the radar altitude measurement (Eq. 1):

$$\delta Alt_{Est} = R \cdot \sin(\phi_{Est}) \quad \text{(Eq. 13)}$$

Continuing the example above, the estimate above ground altitude using the corrected angle is $$\delta Alt_{Est} = R_1 \cdot \sin(\phi_{Est}) = 9,114 \text{ ft} \cdot \sin(3.001°) = 477.178 \text{ ft}$$

The elevation error may be calculated to determine to effectiveness of the error correction term. The elevation error, comparing the estimated above ground altitude calculated with the corrected angle ($\delta Alt_{Est}$) and the actual above ground altitude $\delta Alt_{RunwayEnd1}$ (calculated in the discussion of FIG. 3), is $$\delta Alt_{Error} := \delta Alt_{Est} - \delta Alt_{RunwayEnd1} = 477.178 - 476.955 = 0.223 \text{ ft}$$

Note that calculating the above ground altitude with corrected angle, using the example quantities set forth herein, advantageously reduced the error from approximately 79 feet (as described in the discussion of FIG. 3) to less than 1 foot. An aircraft's altitude may be more accurately estimated using conventional aircraft systems adapted to perform the advantageous process described herein.

In some embodiments, the true aircraft altitude may also be estimated. The estimated true altitude is the sum of the estimated above ground altitude (determined in step 450) and the altitude of the corresponding runway end (received in step 436):

$$Alt_{TrueEst} := \delta Alt_{Est} + Alt_{RunwayEnd} \quad \text{(Eq. 14)}$$

In some embodiments, process 430 may additionally include confirming or adjusting the altitude measurement from other devices. The estimated aircraft altitude may be compared to altitude from a pressure based sensor, a barometer, an inertial navigation system or GPS. When the local GPS/barometric-altitude estimates have been confirmed by the radar process, the aircraft may be able to take advantage of lower landing "credit" allowed by the altitude accuracy check. In some circumstances, e.g., radar transceiver malfunction or weather, the radar measurements on which the estimated real aircraft altitude is based may be unreliable. The radar system may be configured to determine whether such circumstances exist.

In some embodiments, process 430 may additionally include outputting the corrected relative altitude and/or the corrected true altitude at least one of a memory device (e.g., memory 118 of FIG. 2B) or another device of the radar system. For example, a corrected altitude may be output to a display device in an aircraft. An indication of an altitude comparison may also be outputted. The indication may be a side-by-side representation of the calculated altitude and the measured (e.g., barometric) altitude. In other embodiments, the indication may additionally include a confirmation that the measured altitude has been verified and/or that lower landing credit is available. The radar system may be further configured to output an indication that the GPS/barometric-altitude cannot be verified using the estimated true aircraft altitude and/or that the lower landing credit is not available.

Figure 4C:
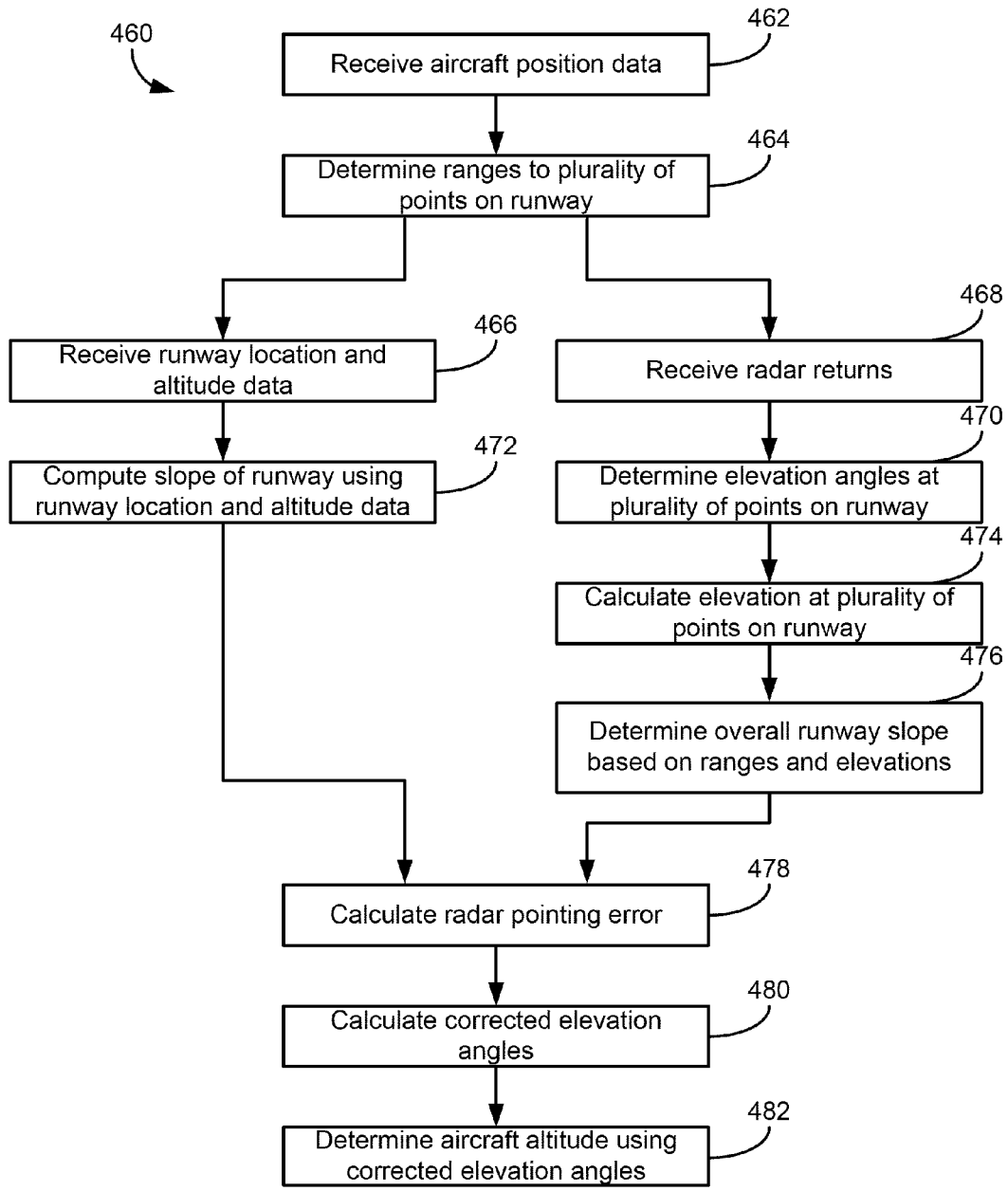
FIG. 4C is a process for determining aircraft altitude using a plurality of slope estimates of a runway, according to another exemplary embodiment.

Referring to FIG. 4C, a process 460 for determining aircraft altitude using a plurality of slope estimates of a runway is shown, according to an exemplary embodiment. Process 460 may be carried out by the apparatus (e.g., radar antenna and processing circuit) of FIG. 2B. Process 460 may be one embodiment of a more-detailed implementation of process 400 (FIG. 4B). Process 460 may include comparing a database-derived slope and a radar-derived slope to identify a radar antenna pointing error. The radar-derived slope may be generated from a plurality of slope estimates of the sensed runway. The aircraft's relative (above ground) and/or true (height above sea level) altitude may be calculated using the corrected angles. Therefore, the aircraft's altitude may be more accurately estimated using conventional aircraft systems adapted to perform the advantageous process described herein.

As set forth in equation 11, the error correction term may be the difference of a measured runway slope (a radar-derived portion) and a runway slope calculated from known data (a database-derived portion). By organizing the error correction term as in equation 11, a radar-derived slope can generated from any set of points (and not just the runway ends). That is, a slope determined using any set of points may be substituted for the radar-derived portion of equation 11. In one embodiment, a plurality of elevations may be determined using ranges and angles at a plurality of points. The ranges and elevations at the plurality of points may be fitted with a line using a robust fitting method. The slope of the fitted line may determine an overall runway slope The overall runway slope may be used as the radar-derivation portion of the error correction term. The database-derived portion may be calculated as in step 442 (FIG. 4B).

In some embodiments, using a plurality of points to determine the overall runway slope allows for a more accurate calculation of angle error. The angle error can be used to correct the elevation angles determined in step 470 (step 480). The aircraft's relative altitude may be calculated using the corrected angles (step 482). Therefore, the aircraft's altitude may be more accurately estimated using conventional aircraft systems adapted to perform the advantageous process described herein. Process 460 may be implemented in lieu of or in addition to process 430 (FIG. 4B). Process 460 may advantageously overcome challenges associated with estimating the slope of a runway when local obstacles are mixed with runway returns received at the radar. Process 460 may advantageously improve the accuracy of the error correction term and, thus, the corrected angles.

The radar-derived slope may be computed using a plurality of points along the runway. The set of points may include any point along the runway, including, but not limited to, the endpoints. According to an exemplary embodiment, the points may be chosen as pairs. In some embodiments, the pairs may be separated by a minimum distance. In some embodiments, points that a radar antenna can most clearly resolve are chosen. In some embodiments, points are identified by the radar antenna and examined to determine whether they fall within particular azimuthal boundaries. The azimuthal boundaries may describe the width of a runway. Points may be discarded if they are not located within the azimuthal boundaries (i.e., they are not within the width of the runway).

Process 460 includes receiving aircraft position data (462), receiving runway location and altitude data (466), and computing runway slope using runway location and altitude data (472). Steps 462, 466, and 472 may be substantially similar to steps 432, 436, and 442, respectively, of process 430 (FIG. 4B).

Process 460 includes determining ranges to a plurality of points on the runway (464). The range to each of the plurality of points may be determined in a similar manner as described in step 434 (FIG. 4B). Process 460 also includes receiving radar returns (468). The radar antenna may be slewed or pointed so that returns associated with each of the plurality of points on the runway are received with the same antenna pose. The radar returns may be received in a similar manner to step 438 (FIG. 4B). The elevation angle at each of the plurality of points on the runway (474) may be determined in a similar manner as step 440 (FIG. 4B).

Process 460 includes calculating elevation at a plurality of points on the runway (474). According to an exemplary embodiment, trigonometric relationships between the ranges to (step 464) and angles at (step 470) the plurality of points are used to calculate the elevation at the plurality of points.

Process 460 includes determining overall runway slope (476). According to an exemplary embodiment, robust fitting methods may be used to determine the overall runway slope from the elevations determined in step 474 and ranges determined in step 464. A plot may be generated to show the elevation as a function of the range. A plurality of data points, corresponding to the plurality of points along the runway, are represented the plot. A robust line fit method may be used to find a fitted line for the data. The slope of the fitted line may be determined to be overall slope of the runway. Robust line fit methods may advantageously accommodate elevation outliers that a two point slope method may not. In addition, line fit methods may advantageously produce slope estimates with lower standard deviations. According to an exemplary embodiment, a RANSAC (Random Access Consensus) or a Hough transform method are used. Other robust line fit methods may be used in other embodiments.

Using a plurality of estimates of the runway slope to calculate the radar antenna pointing error may require a first order assumption is that the runway is flat enough to use. In some embodiments, process 460 may additionally include verifying the assumption that the runway is flat. The assumption may be verified by evaluating statistical residuals associated with the slope of the runway. To verify to the assumption, the differences between the sample slope measurements (e.g., step 474) and the expected slope (e.g., step 472) are calculated. If the sample slopes are statistically close to the expected slope, then the assumption may be valid. If the sample slopes are not statistically close to the expected slope, then the assumption may not be valid. In some embodiments, the radar-derived slope calculations may be accompanied by Gaussian noise (i.e., statistical variation in the sample with a probability density function equal to that of a Gaussian distribution). Using a plurality of data points to generate a plurality of slope estimates may advantageously reduce the Gaussian noise.

Process 460 includes calculating the radar pointing error (478). The error may be computed based on equation 11. The overall runway slope determined in step 476 may be used for the radar-derived portion of the error correction term. The database-derived portion may be computed in step 472. The error correction term calculated in process 460 may advantageously reflect an error that is closer to the actual error (compared to other error calculations) because the measured runway slope (based on the plurality of points on the runway) is closer to the actual runway slope.

Process 460 includes calculating the corrected elevation angles (480) and calculating the relative and/or true aircraft altitude using corrected elevation angles (482). Steps 556 and 558 may be similar to steps 448 and 450 (FIG. 4B), respectively. The corrected angle and aircraft altitude calculated in process 460, as with the error correction term, may be closer to the actual quantities as a result of the more precise slope estimation. In some embodiments, process 460 may additionally include outputting an indication of the corrected altitude (e.g., to a display device), as described in the discussion of FIG. 4B. In some embodiments, process 460 may additionally include confirming or adjusting the altitude measurement from other devices (e.g., a barometric altitude), as described in the discussion of FIG. 4B.

The method of FIGS. 4A-4C may be employed in an onboard aircraft radar system. For example, the radar system may include including a terrain awareness warning system that employs a terrain database. Additionally, the method may be employed without the use of additional equipment and/or airport specific augmentation systems.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of determining altitude of an aircraft using an onboard radar/antenna system, the method comprising:
    receiving first data associated with an aircraft position;
    receiving second data associated with a position of a first point and a second point on the runway, and an altitude of the first point and the second point on the runway;
    providing radar signals to the runway using the onboard radar/antenna system;
    receiving radar returns from the runway using the onboard radar/antenna system wherein third data is associated with the radar returns from the runway;
    determining a first range between the aircraft and the first point on the runway and a second range between the aircraft and the second point on the runway, using the first and second data;
    determining a first angle between the first point on the runway and the aircraft, and a second angle between the second point on the runway and the aircraft, using the third data;
    determining a corrected angle relative to the first point and the second point; and
    determining the altitude of the aircraft based on the corrected angle, the altitude of at least one of the first point and the second point, and at least one of the first range and the second range.

2. The method of claim 1, wherein the first point is a first end of the runway and the second point is a second end of the runway.

3. The method of claim 1, wherein determining a corrected angle comprises:
    calculating an error in at least one of the first angle and the second angle, using the first range, the second range, the first angle, the second angle, an altitude of the first point, and an altitude of the second point; and
    calculating a corrected angle using the error and at least one of the first angle and the second angle.

4. The method of claim 1, wherein determining a corrected angle comprises:
    calculating an error in the response of a radar/antenna system configured to receive the radar returns from the runway; and
    calculating a corrected angle using at least one of the first angle, the second angle, and the error in the response of the radar/antenna system.

5. The method of claim 4, wherein calculating an error in the response of the radar/antenna system comprises:
    computing a first slope of the runway using the altitude and the position of the first point and the second point of the second data;
    estimating a second slope of the runway using at least one of the first angle, the second angle, the first range, and the second range of the third data; and
    calculating an error in the response of the radar/antenna system using the first slope and the second slope.

6. The method of claim 5, wherein the error in the response of the radar/antenna system comprises the difference between the second slope and the first slope.

7. The method of claim 1, wherein the radar returns are received at the radar/antenna system in at least one of a stationary viewing angle and a plurality of viewing angles during one movement interval.

8. An aircraft radar system for an aircraft, comprising:
    a receive circuit configured to receive radar returns from an antenna; and
    processing electronics configured to:
        compute a first slope of a runway;
        estimate a second slope of the runway using the radar returns provided to the processing electronics from the receive circuit, the radar returns being associated with radar signals striking the runway;
        estimate an error in the pointing angle of the antenna using the first slope and the second slope; and
        estimate an aircraft altitude using a range from the aircraft to the runway and a corrected angle between the aircraft and the runway.

9. The aircraft radar system of claim 8, wherein the processing electronics are configured to estimate an aircraft altitude using a range from the aircraft to the runway and the corrected angle between the aircraft and the runway, wherein the error in the pointing angle of the antenna is removed from the corrected angle.

10. The aircraft radar system of claim 8, wherein the processing electronics are configured to compute the first slope of the runway using an altitude and a position of at least two points on the runway.

11. The aircraft radar system of claim 8, wherein the processing electronics are configured to estimate the second slope of the runway using at least one of a first angle between the aircraft and a first point of the runway, a second angle between the aircraft and a second point of the runway, a first range from the aircraft to the first point of the runway, and a second range from the aircraft to the second point of the runway.

12. The aircraft radar system of claim 8, wherein the processing electronics are configured to estimate the second slope of the runway using a plurality of angles to a plurality of points on the runway, and a plurality of ranges from the aircraft to the plurality of points on the runway.

13. The aircraft radar system of claim 12, wherein the processing electronics are configured to use a robust fitting method to determine the second slope from the plurality slopes.

14. The aircraft radar system of claim 8, wherein the processing electronics are configured to estimate the error in the pointing angle by subtracting the first slope from the second slope.

15. An apparatus, comprising:
means for receiving radar returns from the runway; and
means for determining (a) a plurality of ranges between an aircraft and a plurality of points on the runway, the plurality of ranges including a first range between the aircraft and a first point on the runway and a second range between the aircraft and a second point on the runway, using first data associated with an aircraft position and second data associated with positions and altitudes of a plurality of points on the runway, the plurality of points on the runway including the first point and the second point on the runway; (b) a plurality of angles between the aircraft and the plurality of points, using the radar returns; (c) a corrected angle relative to at least two of the plurality of points; and (d) an altitude of the aircraft based on the corrected angle, the altitude and range of at least one of the plurality of points.

16. The apparatus of claim 15, wherein the first point is a first end of the runway and the second point is a second end of the runway.

17. The apparatus of claim 15, wherein the means for determining:
calculates an error in the response of a radar/antenna system configured to receive the radar returns from the runway; and
calculates a corrected angle using at least two of the plurality of angles and the error in the response.

18. The apparatus of claim 17, wherein the means for determining:
estimates a first slope of the runway using the altitude and position of at least two of the points of the second data;
estimates a second slope of the runway using the plurality of ranges and angles of the plurality of points using the radar returns; and
calculates an error in the response using the first slope and the second slope.

19. The apparatus of claim 18, wherein a robust fitting method is used to estimate the second slope.

20. The apparatus of claim 18, wherein the error in the response comprises the difference between the second slope and the first slope.

21. The apparatus of claim 15, wherein the means for receiving receives the radar returns in at least one of a stationary viewing angle and a plurality of viewing angles during one movement interval.

* * * * *